(12) United States Patent
Xue et al.

(10) Patent No.: US 9,654,369 B2
(45) Date of Patent: May 16, 2017

(54) MOBILE TERMINAL NETWORK PORT MANAGEMENT METHOD AND DEVICE

(71) Applicant: ZTE CORPORATION, Shenzhen, Guangdong Province (CN)

(72) Inventors: Tao Xue, Shenzhen (CN); Bin Wang, Shenzhen (CN); Xiangyang Yan, Shenzhen (CN); Chen Lu, Shenzhen (CN); Bin Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 87 days.

(21) Appl. No.: 14/404,058

(22) PCT Filed: Jul. 22, 2013

(86) PCT No.: PCT/CN2013/079802
§ 371 (c)(1),
(2) Date: Nov. 26, 2014

(87) PCT Pub. No.: WO2013/182156
PCT Pub. Date: Dec. 12, 2013

(65) Prior Publication Data
US 2015/0229554 A1    Aug. 13, 2015

(30) Foreign Application Priority Data
Sep. 21, 2012 (CN) .......................... 2012 1 0355373

(51) Int. Cl.
*G06F 15/173*    (2006.01)
*G06F 15/16*    (2006.01)
(Continued)

(52) U.S. Cl.
CPC ...... *H04L 43/0882* (2013.01); *H04L 12/2859* (2013.01); *H04L 41/04* (2013.01); *H04L 43/0817* (2013.01); *H04L 69/16* (2013.01)

(58) Field of Classification Search
CPC . H04L 43/0882; H04L 12/2859; H04L 41/04; H04L 43/0817; H04L 69/16
(Continued)

(56) References Cited

U.S. PATENT DOCUMENTS 6,240,472 B1 * 5/2001 Hu .................... G06F 13/387
710/2
7,453,825 B1 * 11/2008 Sivasankaran .... H04L 12/40182
370/216
(Continued)

FOREIGN PATENT DOCUMENTS

CN    101119534 A    2/2008
CN    101764901 A    6/2010
CN    102905292 A    1/2013

*Primary Examiner* — Melvin H Pollack
(74) *Attorney, Agent, or Firm* — Ling Wu; Stephen Yang; Ling and Yang Intellectual Property

(57) ABSTRACT

Disclosed is a mobile terminal network port management method and device. The method includes: after PPPOE dial up completes, scanning current mobile network equipment port numbers and acquiring currently occupied mobile network ports; detecting and analyzing whether the currently occupied mobile network ports are virtually occupied ports or not; if yes, releasing said virtually occupied ports. The abovementioned technical solution solves an existing problem of possible virtual occupancy of network ports after a PPPOE connection is established, thereby greatly enhancing availability of the mobile terminal and improving the user experience on the terminal.

16 Claims, 6 Drawing Sheets

(51) Int. Cl.
*H04L 12/26* (2006.01)
*H04L 12/28* (2006.01)
*H04L 29/06* (2006.01)
*H04L 12/24* (2006.01)

(58) Field of Classification Search
USPC .................................................. 709/224
See application file for complete search history.

(56) References Cited

U.S. PATENT DOCUMENTS

| | | | | |
|---|---|---|---|---|
| 7,558,266 | B2 * | 7/2009 | Hu | H04L 63/02 |
| | | | | 370/392 |
| 7,568,040 | B2 * | 7/2009 | Townsley | H04L 9/3271 |
| | | | | 709/226 |
| 8,027,248 | B2 * | 9/2011 | Balasubramanian | |
| | | | | H04L 41/0836 |
| | | | | 370/219 |
| 8,036,237 | B2 * | 10/2011 | Kolli | H04L 12/2856 |
| | | | | 370/352 |
| 8,175,223 | B2 * | 5/2012 | Narayanan | H04L 12/2697 |
| | | | | 379/22.03 |
| 8,239,531 | B1 * | 8/2012 | Bellovin | H04L 63/0272 |
| | | | | 709/203 |
| 8,281,015 | B2 * | 10/2012 | Jia | H04L 12/2856 |
| | | | | 709/220 |
| 8,306,025 | B2 * | 11/2012 | Ji | H04L 12/2859 |
| | | | | 370/389 |
| 8,649,386 | B2 * | 2/2014 | Ansari | H04L 12/2814 |
| | | | | 370/401 |
| 8,700,662 | B2 * | 4/2014 | Cara | H04L 12/2874 |
| | | | | 707/781 |
| 8,782,256 | B2 * | 7/2014 | Dec | H04L 41/0806 |
| | | | | 709/222 |
| 8,832,264 | B2 * | 9/2014 | Pauley | H04L 63/306 |
| | | | | 370/428 |
| 8,908,580 | B2 * | 12/2014 | Shen | H04W 36/14 |
| | | | | 370/310 |
| 2002/0091831 | A1 | 7/2002 | Johnson | |
| 2004/0003085 | A1 | 1/2004 | Joseph | |
| 2007/0133576 | A1 | 6/2007 | Tsuge et al. | |
| 2008/0075048 | A1 | 3/2008 | Suszko | |
| 2011/0044308 | A1 | 2/2011 | Kawamura | |
| 2016/0226920 | A1 * | 8/2016 | Ansari | H04L 67/141 |
| | | | | 709/227 |

* cited by examiner

MOBILE TERMINAL NETWORK PORT MANAGEMENT METHOD AND DEVICE

TECHNICAL FIELD

The present document relates to mobile terminal network port management technology, and more particularly, to a mobile terminal network port management method and a device.

BACKGROUND

With the development of communication technology, the user demand for broadband is gradually increasing, PPPOE dial up to access to the residence community LAN is gradually replacing the old conventional telephone line dial up connection since its acceleration and upgrade are easy and stable, and becomes the leading scheme to solve the problem of the community users accessing to the Internet, and because it can support multiple terminal repeat dialing, with combination of this advantage, Telecom also proposes multifunctional network services such as IPTV that do not share bandwidth.

With the gradual update of the terminals for users accessing to the Internet, in addition to computers, more and more mobile terminals such as mobile phones and PADs are also equipped with the function of surfing the Internet. However, since the mobile terminal does not have Ethernet interface, it cannot surf the Net through the network cable, even if the products such as mobile terminal can access to the network via the 3G data services provided by the operators, the speed is unstable, and the expense is also difficult to be accepted by more user groups. As the prices of the intelligent machines continue to drop, there are more and more user groups using intelligent terminals, and such low-end groups are not able to withstand the relatively high cost of 3G Internet surfing, therefore more and more users begin to use wireless router at home to solve the problem of the terminal surfing the Internet.

However, using the wireless router to surf the Internet has the following shortcomings:

1, confidentiality is not high, since a lot of terminals cannot dial up to access to the Internet, they need the wireless router to dial-up itself, but there are many loiter network software tools, which is prone to having loiter network phenomenon;

2, since the Internet connection sharing method is used, the Internet surfing efficiency is very low, even if the wireless router automatically dials up, it will lead to all connected terminals cannot dialing again, there are circumstances that the terminals grab bandwidth with each other.

In order to solve a variety of problems of the mobile terminal surfing the Internet and ensure the efficiency of the terminal surfing the network, the scheme of the terminal itself performing a PPPOE dial-up connection emerges because of demand.

In the scheme of the terminal itself performing the PPPOE dial-up connection, the most important thing is that it needs to manage the mobile network port, and if the mobile network port management has a problem, it will greatly affect the stability of the terminal itself performing the PPPOE dial-up connection, for example, problems such as repeatedly network connection failure and the network connection timeout will happen. The basic reason of the abovementioned problems is because there are network ports virtually occupied after the establishment of PPPOE connection complete. The so-called virtually occupied refers to that network ports fail to be released properly when the network ports are not being used by applications, resulting in that all the network ports are consumed, and a new connection cannot successfully apply for a network port for data connection, thus there are problems such as network connection failure and network connection timeout.

SUMMARY

The main purpose of the embodiments of the present document is to provide a mobile terminal network port management method and device, aimed at solving a existing problem that there may be network ports virtually occupied after a PPPOE connection is established, so as to improve the availability of the mobile terminal and the user experience.

In order to solve the abovementioned technical problem, the following technical solution is used:

A mobile terminal network port management method, comprising:

after a PPPOE dial-up completes, scanning current mobile network equipment port numbers to acquire mobile network ports that are currently occupied;

detecting and analyzing whether said currently occupied mobile network ports are virtually occupied ports or not; if yes, releasing said virtually occupied ports.

Alternatively, further comprising:

according to the situations of current network connection and PPPOE dial-up, performing network connection restoring operation on said released mobile network ports.

Alternatively, the method for scanning the current mobile network equipment port numbers comprises at least one of the following: scanning said current mobile network equipment port numbers for once or periodically.

Alternatively, said step of detecting and analyzing whether said currently occupied mobile network ports are virtually occupied ports or not comprises:

detecting whether a currently occupied mobile network port has data to receive and send or not;

If said currently occupied mobile network port has data to receive and send, determining that said occupied mobile network port is a non-virtually occupied port;

if said currently occupied mobile network port only has data to receive or only has data to send, performing network link detection on said currently occupied mobile network port;

if the detection result is that a HTTP/UDP does not have a packet sending or packet distributing process, determining that said occupied mobile network port is a virtually occupied port; otherwise, it is a non-virtually occupied port.

Alternatively, said step of detecting and analyzing whether said currently occupied mobile network port is a virtually occupied port or not further comprises:

if said mobile terminal is in a dormant state, and said currently occupied mobile network port has data to receive and send, determining that said currently occupied mobile network port is a virtually occupied port.

Alternatively, further comprising:

in a process of releasing said virtually occupied port, judging whether there is an upper-layer application associated with said virtually occupied port or not, and if yes, sending a release notification to said upper-layer application and prompting said upper-layer application to re-establish a network connection as needed.

Alternatively, further comprising:

if the current network connection is interrupted, releasing all the mobile network ports of said mobile terminal;

When the network connection is normal, re-implementing said PPPOE dial-up connection process and notifying said connection result to a terminal user.

A mobile terminal network port management device, comprising a scanning module, a detecting and analyzing module, and an execution processing module, wherein:

said scanning module is configured to: after said PPPOE dial-up completes, scan current mobile network equipment port numbers to acquire currently occupied mobile network ports;

said detecting and analyzing module is configured to: detect and analyze whether said currently occupied mobile network ports are virtually occupied ports or not; if yes, notify said execution processing module;

said execution processing module is configured to: when a currently occupied mobile network port is a virtually occupied port, release said virtually occupied port.

Alternatively, said execution processing module is further configured to: according to situations of current network connection and PPPOE dial-up, perform a network connection restoring operation on said released mobile network port.

Alternatively, said detecting and analyzing module comprises a detecting unit and an analyzing and judging unit, wherein:

said detecting unit is configured to: detect whether a currently occupied mobile network port has data to receive and send or not;

said analyzing and judging unit is configured to: when said currently occupied mobile network port has data to receive and send, determine that said occupied mobile network port is a non-virtually occupied port; when said currently occupied mobile network port only has data to receive or only has data to send, perform network link detection on said currently occupied mobile network port; if the detection result is that a HTTP/UDP does not have a packet sending or packet distributing process, determine that said occupied mobile network port is a virtually occupied port; otherwise, determine that said occupied mobile network port is a non-virtually occupied port.

Alternatively, said analyzing and judging unit is further configured to: when said mobile terminal is in a dormant state, and a currently occupied mobile network port has data to receive and send, determine that said currently occupied mobile network port is a virtually occupied port.

Alternatively, said execution processing module is further configured to: in the process of releasing said virtually occupied port, judge whether there is an upper-layer application associated with said virtually occupied port or not, and if yes, send a release notification to said upper-layer application, and prompt said upper-layer application to re-establish a network connection as needed.

Alternatively, said exception handling module is configured to: when the current network connection is interrupted, release all the mobile network ports of said mobile terminal; and when the network connection is normal, re-implement the PPPOE dial-up process, and notify said connection result to the terminal user.

In a mobile terminal network port management method and device in accordance with the abovementioned technical solution, after the completion of a PPPOE dial-up, by scanning the current mobile network equipment port numbers, detecting and analyzing the currently occupied mobile network ports to judge whether they are virtually occupied ports or not, and releasing the detected virtually occupied ports, as well as the subsequent connection restoring processing, it solves the existing problem that there may have network ports virtually occupied after the PPPOE connection is established, greatly enhancing the availability of the mobile terminal and improving the user experience on the terminal.

In order to make the technical scheme of the present document more apparent and clearer, it will be described in further detail with reference to the accompanying drawings.

PREFERRED EMBODIMENTS OF THE PRESENT

The technical solution in accordance with the embodiment of the present document is mainly: after the PPPOE dial-up completes, scanning the current mobile network equipment port numbers, and detecting and analyzing the currently occupied mobile network ports, judging whether said currently occupied mobile network port are virtually occupied ports or not, and releasing and restoring the detected virtually occupied ports, so as to enhance the availability of mobile terminal and to improve the user experience on the terminal.

Figure 1:
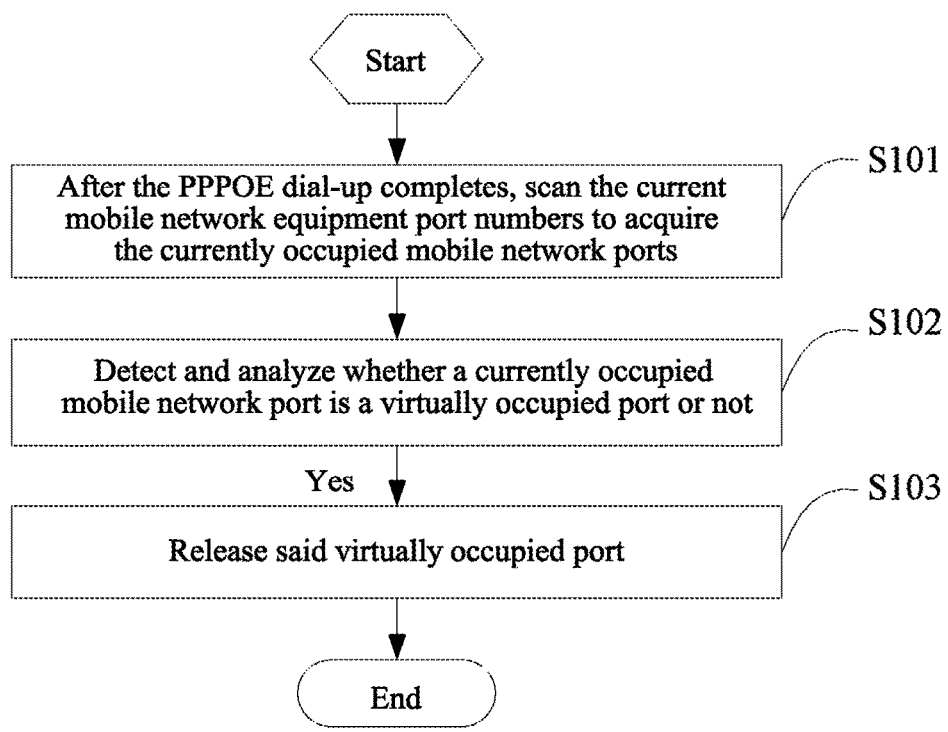
FIG. 1 is a schematic diagram of a mobile terminal network port management method in accordance with an embodiment of the present document.

As shown in FIG. 1, an embodiment of the present document provides a mobile terminal network port management method, comprising the following steps:

step S101, after the PPPOE dial-up completes, scan the current mobile network equipment port numbers to acquire the currently occupied mobile network ports;

when the PPPOE dial-up completes, it needs to scan the current mobile network equipment port numbers.

Wherein, the scanning process may be a one-time scan, or periodic scans, it may also start to boot after the network port occupancy rate reaches to a certain percentage.

Said scanning process is mainly a scan of logic occupancy, and the occupancy condition of all the mobile network ports is acquired by the scanning, that is, collecting which network ports are allocated to process by each application in the current software, and which upper applications these ports are associated with.

For a network port that has been assigned to process by application, determine that said network port is an occupied port, and this occupied port is used as the network port needed to be further judged whether is a virtually occupied port or not.

Step S102, detect and analyze whether a currently occupied mobile network port is a virtually occupied port or not; if yes, proceed to step S103.

For every occupied network port scanned out in step 101, it needs to be judged whether there is a virtual occupancy or not. First, judge whether the currently occupied mobile network port has data to send or not, if yes, judge whether it has data to receive or not, if both are yes, it indicates that said mobile network port is not virtually occupied.

If either is yes, that is, in the case that the occupied mobile network port only has data to send or only has data to receive, it needs further network link, mainly detect whether the HTTP (HyperText Transfer Protocol)/UDP (User datagram Protocol) has a packet sending process and packet distributing process or not, so as to judge whether said link is virtually occupied or not.

If in the network link detection process, it detects that said HTTP/UDP does not have a packet sending or packet distributing process, it indicates that said mobile network port is a virtually occupied port; otherwise, it is a non-virtually occupied port.

In the abovementioned judging whether said currently occupied mobile network port is a virtually occupied port or not, if the mobile terminal is currently in a dormant state, and said currently occupied mobile network port has data to receive and send, determine that said currently occupied mobile network port is a virtually occupied port.

Step S103, release said virtually occupied port.

When it is determined as a virtually occupied port, it needs to release said virtually occupied port.

Furthermore, in the process of releasing said virtually occupied mobile network port, it further needs to judge whether there is an upper-layer application associated with said network port or not, if yes, it needs to send a release notification to said upper-layer application, and also prompt said upper-layer application to re-establish a network connection as needed.

For the abovementioned mobile terminal that is in the dormant state, since it does not need to send or receive data at this time, the network port that still has data to send and receive at this time is confirmed as a virtually occupied port, and is directly released.

Figure 2:
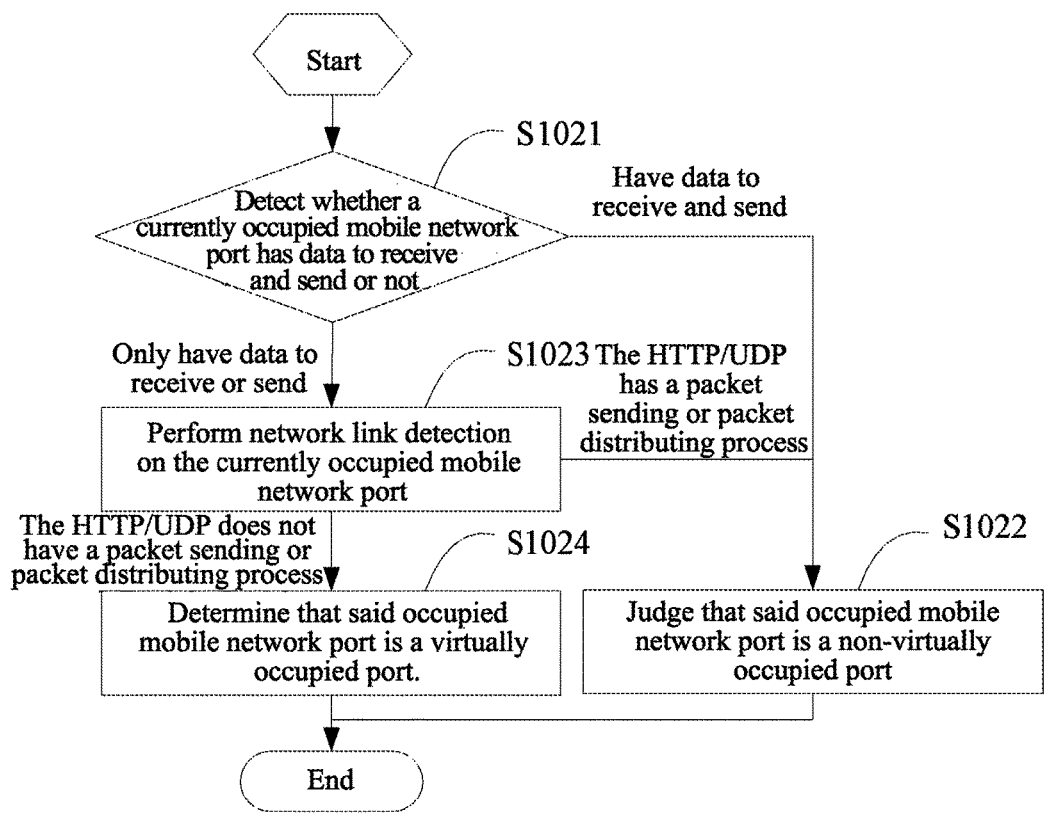
FIG. 2 is a schematic diagram of a process of detecting and analyzing whether a currently occupied mobile network port is a virtually occupied port or not in the mobile terminal network port management method in accordance with an embodiment of the present document.

As shown in FIG. 2, the step of detecting and analyzing whether the currently occupied mobile network port is a virtually occupied port or not in step S102 comprises:

step S1021, detect whether a currently occupied mobile network port has data to receive and send or not; if the currently occupied mobile network port has data to receive and send, proceed to step S1022; if the currently occupied mobile network port only has data to receive or only has data to send, proceed to step S1023;

Step S1022, judge whether said occupied mobile network port is a virtually occupied port or not;

Step S1023, perform a network link detection on the currently occupied mobile network port; if the detection result is that said HTTP/UDP does not have a packet sending or packet distributing process, proceed to step S1024; otherwise, proceed to step S1022;

Step S1024, determine that said occupied mobile network port is a virtually occupied port.

The abovementioned judging whether there is data to send and receive can be implemented by monitoring the data sending and receiving. For example, a timer can be set to monitor. For example, a 5 minutes timer is set to monitor, then if there is data to send and receive within 5 minutes, it is considered that the port is not virtually occupied; if there is only data to send or only data to receive within 5 minutes, it is considered that the port might be virtually occupied, and it needs to further perform network link detection and judgment. If the detection result is that the HTTP/UDP does not have a packet sending or packet distributing process, it is determined that said occupied mobile network port is a virtually occupied port; otherwise, it is a non-virtually occupied port.

The abovementioned judging whether there is data to send and receive can also be independently set according to the type of the application associated with said network port. For example, if the associated application is an instant messaging (IM) application, the monitoring time of said timer can be set long; also for example, if said associated application is a video playback application or a download application, the monitoring time of said timer can be set short.

Through the abovementioned solution, this embodiment solves the existing problem that there are network ports virtually occupied after the PPPOE connection is established, greatly enhancing the availability of the mobile terminal and improving the user experience on the terminal. Moreover, the method of this embodiment can take full advantage of the upgrade simplicity and easy transformation of the user terminal software, and only needs the user to appropriately change the terminal software, so as to solve the existing problem that there may have network ports virtually occupied after the PPPOE connection is established.

This method can be widely used in a variety of terminal equipments, such as mobile phones, desktop telephones, and so on.

Figure 3:
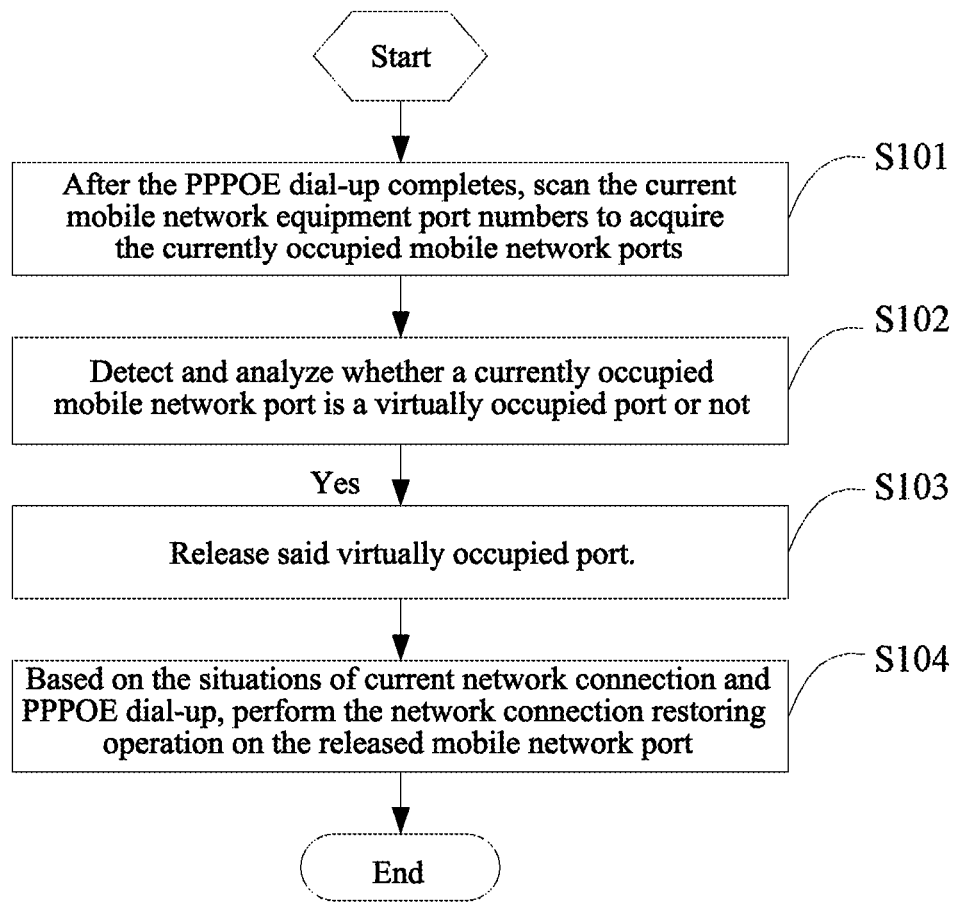
FIG. 3 is a schematic diagram of a mobile terminal network port management method in accordance with another embodiment of the present document.

As shown in FIG. 3, another embodiment of the present document provides a mobile terminal network port management method, and on the basis of the abovementioned embodiment, after the abovementioned step S103, it further comprises:

step S104, based on the situations of current network connection and PPPOE dial-up, perform the network connection restoring operation on the released mobile network port.

The difference between the present embodiment and the abovementioned embodiment is that, in this embodiment, after releasing the virtually occupied mobile network port, it can also, based on the situations of current network connection and PPPOE dial-up, judge whether it needs to restore the network connection or not. If it needs to restore the network connection, performs the corresponding restoring operation, so as to meet the terminal's actual needs.

Through the abovementioned solution, this embodiment not only solves the existing problem that there may be network ports virtually occupied after the PPPOE connection is established, and releases the virtually occupied port so as to improve the availability of mobile terminal; but also, restores the network connection based on the situations of current network connection and PPPOE dial-up, so as to improve the performance of the mobile terminal and the user experience.

Figure 4:
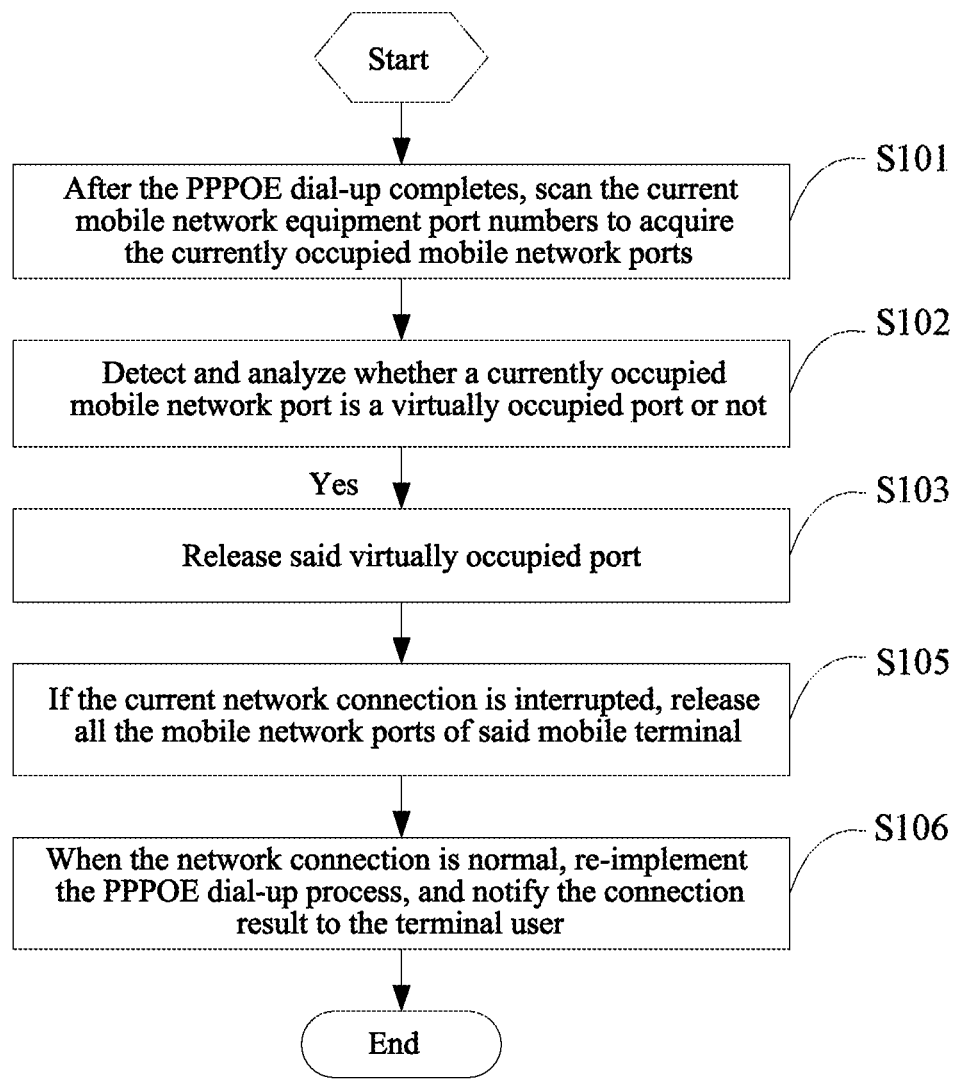
FIG. 4 is a schematic diagram of a mobile terminal network port management method in accordance with still another embodiment of the present document.

As show in FIG. 4, still another embodiment of the present document provides a mobile terminal network port management method, on the basis of the embodiment shown in FIG. 1, after the abovementioned step S103, it further comprises:

step S105, if the current network connection is interrupted, release all the mobile network ports of said mobile terminal;

step S106, when the network connection is normal, re-implement the PPPOE dial-up process, and notify the connection result to the terminal user.

The difference between the present embodiment and the abovementioned embodiment shown in FIG. 1 is that, the present embodiment further comprises a process of handling the network exception.

Alternatively, if detecting that the current network connection is interrupted, it needs to release all the mobile network ports; until the network connection is normal, re-implement the PPPOE dial-up process and notify the connection result to the terminal user.

Through the abovementioned solution, this embodiment not only solves the existing problem that there may be network ports virtually occupied after the PPPOE connection is established, and releases the virtually occupied port so as to improve the availability of mobile terminal; but also, releases all the mobile network ports when detecting the exception that the current network connection is interrupted, and after the network connection becomes normal, re-implements the PPPOE dial-up process to improve the performance of the mobile terminal, meet the user needs, and improve the user experience.

Figure 5:
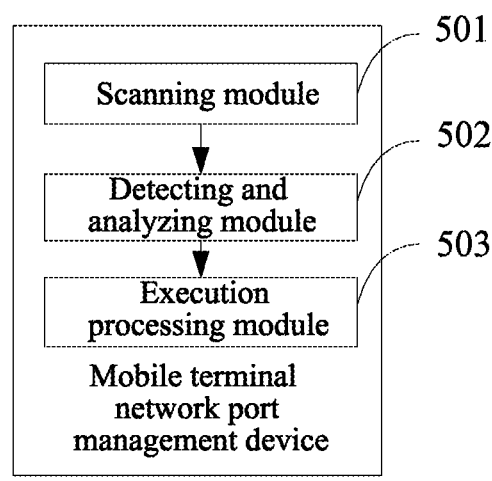
FIG. 5 is a structural diagram of a mobile terminal network port management device in accordance with an embodiment of the present document.

As shown in FIG. 5, an embodiment of the present document provides a mobile terminal network port management device, comprising scanning module 501, detecting and analyzing module 502, and execution processing module 503, wherein:

said scanning module 501 is configured to: after the PPPOE dial-up completes, scan the current mobile network equipment port numbers to acquire the currently occupied mobile network ports;

said detecting and analyzing module 502 is configured to: detect and analyze whether said currently occupied mobile network port are virtually occupied ports or not; if yes, said execution processing module 503 is configured to: when a currently occupied mobile network port is a virtually occupied port, releasing said virtually occupied port.

When the PPPOE dial-up completes, said scanning module 501 needs to scan said current mobile network equipment port numbers.

Wherein, said scanning process may be a one-time scan, or periodic scans, it may also start to boot after the network port occupancy rate reaches to a certain percentage.

Said scanning process is mainly a logic occupancy scan, and the occupancy condition of all the mobile network ports is acquired by scanning, that is, collect which network ports are allocated to process by each application in the current software, and which upper-layer applications these ports are associated with.

For a network port that has been allocated to process by an application, the network port is determined as an occupied port, and this occupied port is used as a network port needing to be further judged whether is a virtually occupied port or not.

For each occupied network port that is scanned out, said detecting and analyzing module 502 needs to perform processing on judging whether there is virtual occupancy or not. First, judge whether the currently occupied mobile network port has data to send or not, if yes, judge whether it has data to receive or not, if both are yes, it illustrates that said mobile network port is not virtually occupied.

If either is yes, that is, in the case that the occupied mobile network port only has data to send or only has data to receive, it also needs to further detect the network link, mainly detect whether the HTTP (HyperText Transfer Protocol)/UDP (User datagram Protocol) has a packet sending process and packet distributing process or not, based on which judge whether said link is virtually occupied or not.

If in the network link detection process, it detects that the HTTP/UDP does not have a packet sending or packet distributing process, it illustrates that said mobile network port is a virtually occupied port; otherwise, it is a non-virtually occupied port.

In the abovementioned judging whether the currently occupied mobile network port is a virtually occupied port, if the mobile terminal is currently in the dormant state, and the currently occupied mobile network port has data to receive and send, determine that the currently occupied mobile network port is a virtually occupied port.

After determining said virtually occupied port, said execution processing module 503 needs to release said virtually occupied port.

Alternatively, in the process of releasing said virtually occupied mobile network port, said execution processing module 503 further needs to judge whether there is an upper layer application associated with said network port or not, if yes, it needs to send a release notification to said upper layer application, and also prompts said upper layer application to re-establish a network connection as needed.

For the abovementioned mobile terminal that is in the dormant state, since at this time it does not need to send and receive data, the network port that still has data to send and receive is confirmed at this time as a virtually occupied port, and directly release the port.

Figure 6:
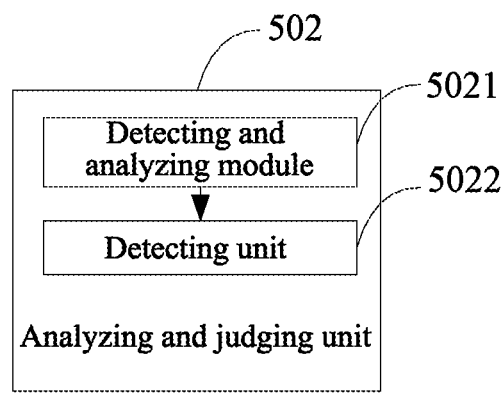
FIG. 6 is a structural diagram of a detecting and analyzing module in the mobile terminal network port management device in accordance with an embodiment of the present document.

As shown in FIG. 6, said detecting and analyzing module 502 comprises detecting unit 5021 and analyzing and judging unit 5022, wherein:

said detecting unit 5021 is configured to: detect whether said currently occupied mobile network port has data to receive and send or not;

said analyzing and judging unit 5022 is configured to: when the currently occupied o mobile network port has data to receive and send, determine that said occupied mobile network port is a non-virtually occupied port; and when the currently occupied mobile network port only has data to receive or only has data to send, perform a network link detection on the currently occupied mobile network port; if the detection result is that the HTTP/UDP does not have packet sending or packet distributing process, determine that the occupied mobile network port is a virtually occupied port; otherwise, determine that said occupied mobile network port is a non-virtually occupied port.

The abovementioned judging whether there is data to send and receive can be implemented by monitoring the data send and receive. For example, a timer can be set to monitor. For example, a 5 minutes timer is set to monitor, if there is data to send and receive within 5 minutes, it is considered that the port is not virtually occupied; if there is only data to send or only data to receive within 5 minutes, it is considered that the port might be virtually occupied, it needs to further perform network link detection and judgment. If the detection result is that the HTTP/UDP does not have a packet sending or packet distributing process, it is determined that the occupied mobile network port is a virtually occupied port; otherwise, it is a non-virtually occupied port.

The abovementioned judging whether there is data to send and receive can also be independently set according to the type of the application associated with the network port. For example, if the associated application is an instant messaging (IM) application, the monitoring time of said timer can be set long; also for example, if the associated application is a video playback application or a download application, the monitoring time of said timer can be set short.

Alternatively, said analyzing and judging unit 5022 is further configured to: when said mobile terminal is in the dormant state, and the currently occupied mobile network port has data to receive and send, determine that said currently occupied mobile network port is a virtually occupied port.

Alternatively, said execution processing module 503 is further configured to: according to the situations of current network connection and PPPOE dial-up, perform a network connection restoring operation on the released mobile network port, thereby improving the performance of the mobile terminal and the user experience.

Through the abovementioned solution, this embodiment solves the existing problem that there may have network ports virtually occupied after the PPPOE connection is established, thus significantly improving the availability of mobile terminal and the user experience on the terminal.

In addition, it also can restore the network connection based on the situations of current network connection and PPPOE dial-up, and improve the performance of the mobile terminal and the user experience.

Moreover, this embodiment can take full advantage of the upgrade simplicity and easy transformation of the user terminal software, it only needs to appropriately change the user terminal software to solve the existing problem that there may be network ports virtually occupied after the PPPOE connection is established.

Said device can be widely used in a variety of terminal equipments, such as mobile phones, desktop telephones, and so on.

Figure 7:
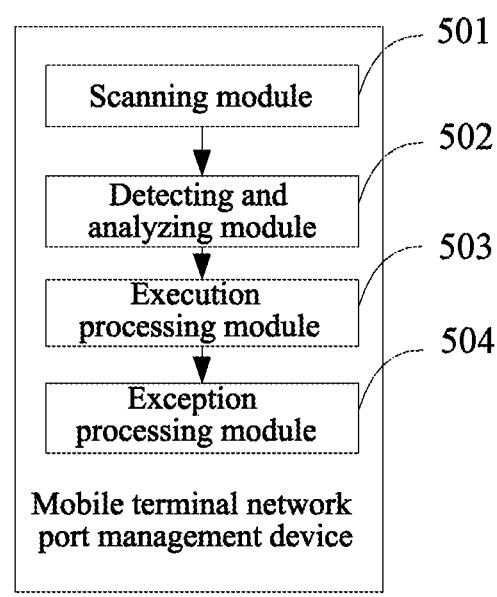
FIG. 7 is a structural diagram of a mobile terminal network port management device in accordance with another embodiment of the present document.

As shown in FIG. 7, another embodiment of the present document provides a mobile terminal network port management device, on the basis of the abovementioned embodiment, further comprising:

exception handling module 504, set to: when the current network connection is interrupted, release all the mobile network ports of said mobile terminal; and when the network connection is normal, re-implement the PPPOE dial-up process and notify the connection result to the terminal user.

The difference between this embodiment and the abovementioned embodiment is that this embodiment further comprises the network exception handling process.

Alternatively, if said exception handling module 504 detects that the current network connection is interrupted, it needs to release all the mobile network ports; while when the network connection is normal, re-implement the PPPOE dial-up process and notify the connection result to the terminal user.

Through the abovementioned solution, this embodiment not only solves the existing problem that there may be network ports virtually occupied after the PPPOE connection is established, and releases the virtually occupied port so as to improve the availability of the mobile terminal; but also, releases all the mobile network ports when an exception that the current network connection is interrupted is detected, and re-implement the PPPOE dial-up process after the network connection becomes normal, so as to improve the availability of the mobile terminal, meet the user needs, and improve the user experience.

The device of this embodiment can be applied to various types of terminals, and the telecom operators only need to appropriately change the user terminal software (adding the corresponding service software modules) to meet the requirements.

The above description is only preferred embodiments of the present document, and is not used to limit the patent scope of the present document, equivalent structures or equivalent process transformations made according to the accompanying drawings and the specification of the present document, either directly or indirectly used in the other related arts, should be included in the claim scope of the present document.

INDUSTRIAL APPLICABILITY

A mobile terminal network port management method and device in accordance with the abovementioned technical solution, after the completion of a PPPOE dial-up, by scanning the current mobile network equipment port numbers, detect and analyze the currently occupied mobile network ports to judge whether they are virtually occupied ports or not, and release the detected virtually occupied ports, as well as process the subsequent connection restoring, so as to solve the existing problem that there may have network ports virtually occupied after the PPPOE connection is established, greatly enhancing the availability of the mobile terminal and improving the user experience on the terminal. Therefore, the present document has very strong industrial applicability.

What we claim is:

1. A mobile terminal network port management method, comprising:
    after a PPPOE dial-up completes, scanning current mobile network equipment port numbers to acquire mobile network ports that are currently occupied;
    detecting and analyzing whether said currently occupied mobile network ports are virtually occupied ports or not, wherein each virtually occupied port refers to that a network port fails to be released properly when that network port is not being used by an application, if yes, then
    releasing said virtually occupied ports;
    wherein said step of detecting and analyzing whether said currently occupied mobile network ports are virtually occupied ports or not comprises:
    detecting whether a currently occupied mobile network port has data to receive and send or not;
    if said currently occupied mobile network port has data to receive and send, determining that said occupied mobile network port is a non-virtually occupied port;
    if said currently occupied mobile network port only has data to receive or only has data to send,
    performing a network link detection on said currently occupied mobile network port;
    if the detection result is that a HTTP/UDP does not have a packet sending or packet distributing process, determining that said occupied mobile network port is a virtually occupied port; otherwise, determining that it is a non-virtually occupied port.

2. The method of claim 1, wherein, said method further comprises:
    according to situations of current network connection and PPPOE dial-up, performing a network connection restoring operation on said released mobile network ports.

3. The method of claim 1, wherein, a method for scanning the current mobile network equipment port numbers comprises at least one of the following: scanning said current mobile network equipment port numbers for once or periodically.

4. The method of claim 1, wherein, said step of detecting and analyzing whether said currently occupied mobile network port is a virtually occupied port or not further comprises:

if said mobile terminal is in a dormant state and said currently occupied mobile network port has data to receive and send, determining that said currently occupied mobile network port is a virtually occupied port.

5. The method of claim 1, wherein, said method further comprises:

in a process of releasing said virtually occupied port, judging whether there is an upper-layer application associated with said virtually occupied port or not, and if yes, sending a release notification to said upper-layer application and prompting said upper-layer application to re-establish a network connection as needed.

6. The method of claim 5, wherein, said method further comprises:

if the current network connection is interrupted, releasing all the mobile network ports of said mobile terminal;

when the network connection is normal, re-implementing said PPPOE dial-up connection process and notifying a connection result to a terminal user.

7. A mobile terminal network port management device, comprising a scanning module, a detecting and analyzing module, and an execution processing module, wherein:

said scanning module is configured to: after said PPPOE dial-up completes, scan current mobile network equipment port numbers to acquire currently occupied mobile network ports;

said detecting and analyzing module is configured to: detect and analyze whether said currently occupied mobile network ports are virtually occupied ports or not, wherein each virtually occupied port refers to that a network port fails to be released properly when that network port is not being used by an application, if yes, notify said execution processing module;

said execution processing module is configured to: when a currently occupied mobile network port is a virtually occupied port, release said virtually occupied port;

wherein, said detecting and analyzing module comprises a detecting unit and an analyzing and judging unit, wherein:

said detecting unit is configured to: detect whether a currently occupied mobile network port has data to receive and send or not;

said analyzing and judging unit is configured to: when said currently occupied mobile network port has data to receive and send, determine that said occupied mobile network port is a non-virtually occupied port; when said currently occupied mobile network port only has data to receive or only has data to send, perform network link detection on said currently occupied mobile network port; if the detection result is that a HTTP/UDP does not have a packet sending or packet distributing process, determine that said occupied mobile network port is a virtually occupied port; otherwise, determine that said occupied mobile network port is a non-virtually occupied port.

8. The device of claim 7, wherein, said execution processing module is further configured to: according to situations of current network connection and PPPOE dial-up, perform a network connection restoring operation on said released mobile network port.

9. The device of claim 7, wherein, said analyzing and judging unit is further configured to: when said mobile terminal is in a dormant state, and a currently occupied mobile network port has data to receive and send, determine that said currently occupied mobile network port is a virtually occupied port.

10. The device of claim 7, wherein, said execution processing module is further configured to: in the process of releasing said virtually occupied port, judge whether there is an upper-layer application associated with said virtually occupied port or not, and if yes, send a release notification to said upper-layer application, and prompt said upper-layer application to re-establish a network connection as needed.

11. The device of claim 10, and said device comprising an exception handling module, wherein, said exception handling module is configured to: when the current network connection is interrupted, release all mobile network ports of said mobile terminal; and when the network connection is normal, re-implement the PPPOE dial-up process, and notify a connection result to a terminal user.

12. The method of claim 2, wherein, said method further comprises:

in a process of releasing said virtually occupied port, judging whether there is an upper-layer application associated with said virtually occupied port or not, and if yes, sending a release notification to said upper-layer application and prompting said upper-layer application to re-establish a network connection as needed.

13. The method of claim 3, wherein, said method further comprises:

in a process of releasing said virtually occupied port, judging whether there is an upper-layer application associated with said virtually occupied port or not, and if yes, sending a release notification to said upper-layer application and prompting said upper-layer application to re-establish a network connection as needed.

14. The method of claim 4, wherein, said method further comprises:

in a process of releasing said virtually occupied port, judging whether there is an upper-layer application associated with said virtually occupied port or not, and if yes, sending a release notification to said upper-layer application and prompting said upper-layer application to re-establish a network connection as needed.

15. The device of claim 8, wherein, said execution processing module is further configured to: in the process of releasing said virtually occupied port, judge whether there is an upper-layer application associated with said virtually occupied port or not, and if yes, send a release notification to said upper-layer application, and prompt said upper-layer application to re-establish a network connection as needed.

16. The device of claim 9, wherein, said execution processing module is further configured to: in the process of releasing said virtually occupied port, judge whether there is an upper-layer application associated with said virtually occupied port or not, and if yes, send a release notification to said upper-layer application, and prompt said upper-layer application to re-establish a network connection as needed.

* * * * *